Oct. 22, 1957     ABDEL-RAHMAN K. GAAFAR     2,810,176
TAG FASTENER
Filed Feb. 14, 1956
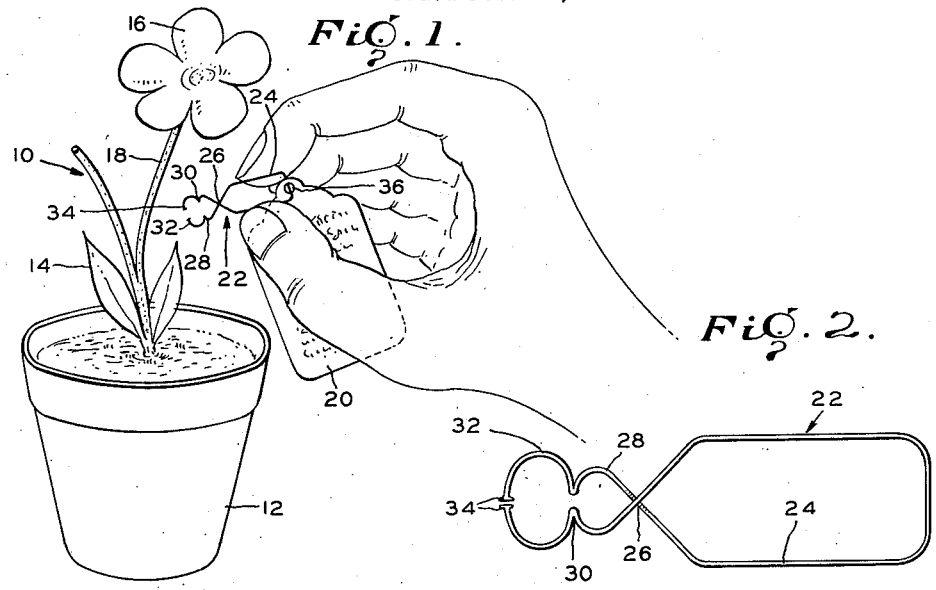
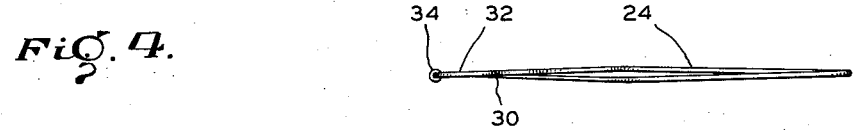
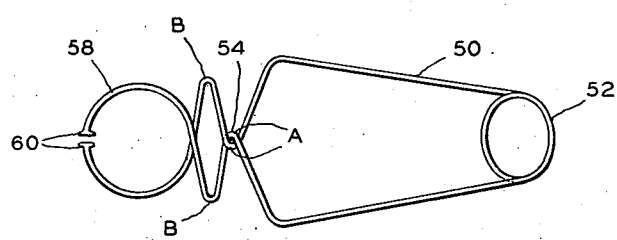
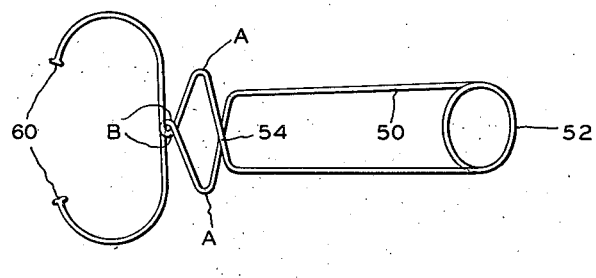
INVENTOR
Abdel-Rahman K. Gaafar.
BY *Justan Miller*
ATTORNEY

United States Patent Office 2,810,176
Patented Oct. 22, 1957

2,810,176

TAG FASTENER

Abdel-Rahman K. Gaafar, Baton Rouge, La.

Application February 14, 1956, Serial No. 565,360

1 Claim. (Cl. 24—237)

This invention relates to a tag or label adapted to be releasably attached to an article, and it particularly relates to a tag or label adapted to be attached to plant organs without any danger of injury to the plants.

Heretofore, tags or labels for such items as flowers, leaves, and fruits, were generally made of paper or wood and were attached to the plants by means of threads. Although a wire attachment was sometimes used, this was only for labeling trees or other plant life having a relatively tough tissue structure by twisting the wire on the plant organs.

Among the difficulties inherent in the thread attachment process was the fact that fitting the knot of the thread in the proper place required both hands. This was necessary since one had to first pass the thread around the plant organ, then one had to pass the label through the thread, and finally one had to pull the paper label around in order to adjust it to the proper position. All this not only required the use of both hands but was time-consuming, tedious and often resulted in damage to the plant, especially when the plant included a cluster of closely packed flowers which had to be twisted and lifted in order to get the thread in position.

Since proper labeling of the plant organisms is an important aspect of biological research, it is highly important that a method of labeling be used whereby the label attaching means is adapted to surround the plant quickly and easily without injuring the plant tissue. This is, therefore, the primary object of the present invention.

Another object of the present invention is to provide a tag or label attachment which is simple in construction but which effects a tight and secure grip on the plant.

Other objects of the present invention are to provide an improved tag fastener, of the character described, that is easily and economically produced, which is sturdy in construction, and which is efficient in operation.

With the above and related objects in view, this invention consists in the details of construction and combination of parts, as will be more fully understood from the following description, when read in conjuction with the accompanying drawing in which:

Fig. 1 is a perspective view showing a device, embodying the present invention, in the process of being attached to a plant.

Fig. 2 is a top plan view of the fastening device shown in Fig. 1.

Fig. 3 is a side elevational view of the device of Fig. 2.

Fig. 4 is a top plan view of an alternative embodiment of the invention, the device being shown in closed position.

Fig. 5 is a view similar to Fig. 4, but showing the device open.

Referring now in greater detail to the drawing wherein similar reference characters refer to similar parts, there is shown a plant 10 in a flower pot 12 and having leaves 14 and a flower 16 on a stem 18.

The stem 18 is double branched and the leaves and flower make it rather difficult to insert the fingers without pulling and, perhaps, crushing the various parts of the plant; however the tag 20 is easily applied in this case by means of the fastener, generally designated 22.

The fastener 22 comprises a single strip of wire bent to form a generally rectangular handle portion 24 and a neck portion 26. The neck portion 26 is formed by crossing the two legs of the handle portion over on each other. These legs are then bent around in opposite directions to form a bridge portion 28. The two legs of the bridge portion are then bent inwardly toward each other to form the constriction 30, and are then bent outwardly again to form the enlarged gripping head 32. The ends of the wire, at the front end of the gripping head, are brought toward each other but do not quite contact. These ends are provided with flattened portions 34. These flattened end portions are used in order to avoid any injury to the plant tissue.

In operation, the label 20, which is provided with an opening 36, is inserted onto the rear portion of the handle member 50. Then, by means of a slight pressure on the handle portion, the gripping head 32 is opened and enclosed around the plant stem 18. The inherent resilience of the device plus the constriction 30 will act to hold the device on the plant. If the plant stem is relatively wide, the two flat ends 34 may be spread apart and bear on opposite sides of the plant; however, they will not injure the plant because of their flat contour.

In Figs. 4 and 5 there is shown an alternative form of the invention.

In this embodiment, the legs of the handle portion 50 are inherently tapered outwardly from a coil portion 52. The legs of the handle portion then cross each other at 54 by means of a pair of V-shaped loops A—A. The legs then taper outwardly to oppositely extending V-shaped loops B—B, and, finally, curve around to form a split-ring type gripping head 58. Flat gripping portions 60 are provided at the open ends of the gripping head.

The main advantage of this second form of the invention lies in the provision of the loops A—A and B—B. In closed position, as shown in Fig. 4, the V-shaped loops A—A interlock to maintain the device closed until pressure is positively applied to the handle. When pressure is applied, however, as by squeezing the handle portion 50 to open the gripping head, the loops A—A move away from each other into the position shown in Fig. 5, and the loops B—B move into interengagement with each other, as shown. When the loops B—B come together, they limit further opening of the gripping head and, thereby, hold the open head steady. This facilitates handling of the device while it is being attached to the plant.

The coil and the tapered construction of the handle portion 50, furthermore, makes this device somewhat more resilient.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A safety tag fastener for plant organisms comprising a relatively large handle portion adapted to carry a tag, said handle portion having oppositely disposed legs which are constructed and arranged to cross each other at the front end of said handle, thereby constituting a neck portion, said legs having extensions forming an enlarged mid-portion at the front end of said neck portion, the extended leg portions constituting said mid-portion having a constricted portion at the front end thereof and further extending to form an enlarged gripping head, said head being constituted by the terminal portions of said leg means forming a split ring with the end of said extended leg portions being flattened and normally spaced apart whereby injury to plant tissue coming in contact with said gripping head will be substantially avoided.

References Cited in the file of this patent

UNITED STATES PATENTS

| | | |
|---|---|---|
| 93,456 | Lines | Aug. 10, 1869 |
| 1,619,783 | Chase | Mar. 1, 1927 |